Aug. 28, 1956　　　A. U. BRYANT　　　2,760,925
METHOD FOR SURFACING ALUMINUM
Filed March 14, 1952
FIG_1_
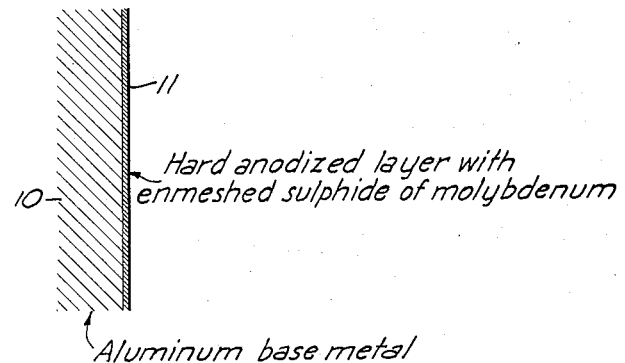
FIG_2_
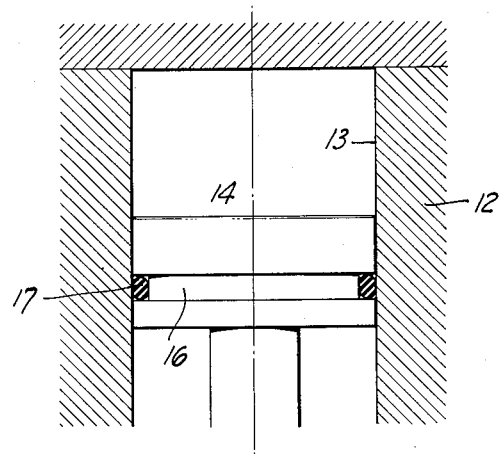
INVENTOR.
Austin U. Bryant
BY
ATTORNEYS

United States Patent Office 2,760,925
Patented Aug. 28, 1956

2,760,925

METHOD FOR SURFACING ALUMINUM

Austin U. Bryant, Berkeley, Calif., assignor to Grove Valve and Regulator Company, a corporation of California Application March 14, 1952, Serial No. 276,650

1 Claim. (Cl. 204—38)

This invention relates generally to methods for providing a desired surfacing on aluminum or aluminum base alloys, and to products resulting from such methods.

O rings formed of resilient rubber have been widely used in many industrial appliances for providing a fluid tight seal between interfitting parts. For example, they have been used in place of conventional gaskets, instead of conventional packing glands about a longitudinally moving rod or stem, or to take the place of conventional sealing rings to form a seal between a piston and its associated cylinder. Also as shown in copending application, Serial Number 3,728, filed January 22, 1948, now Patent No. 2,713,989, issued July 26, 1955, they have been incorporated in valves to provide a fluid tight seal between the valve working parts. In certain of these applications the O ring is caused to slide over an associated surface with which it seals and this sliding action may cause considerable wear, particularly when the ring is resisting a relatively high differential fluid pressure. Also under relatively high pressures thhe resilient O ring is pressed more tightly against the associated surfaces, thus tending to increase the force required to move the parts with respect to each other. In many instances these are undesirable characteristics tending to cause excessive wear of the O ring, and making operation of appliances difficult under various pressure conditions.

Ordinary lubricants, such as oils or greases, can be applied between the interfitting parts in order to reduce sliding friction with respect to the O ring. Under many conditions it is difficult to maintain such lubrication, and the friction after lubrication does not remain constant over a long period of time, or over a wide temperature range. As will be presently explained, in some instances it is desirable to maintain constant frictional characteristics between relatively moveable parts, irrespective of changes in operating conditions.

In general it is an object of the present invention to provide a method for forming a special surfacing upon aluminum or aluminum base materials, and which is particularly well adapted for use in conjunction with O ring seals.

Another object of the invention is to provide a product resulting from the above method, which will minimize wear on O rings which are in sliding engagement with the same, and which will make possible substantially constant friction characteristics.

Additional objects of the invention will appear from the following description in which the preferred embodiment has been set forth in detail in conjunction with the accompanying drawing.

Referring to the drawing:

Figure 1 is a greatly enlarged cross-sectional view illustrating an aluminum base body which has been surfaced in accordance with the present invention.

Figure 2 is a schematic view illustrating a piston cylinder assembly in which the inner surfaces of the cylinder have been surfaced in accordance with the present invention.

According to the present invention, an aluminum base metal, preferably a relatively hard aluminum alloy like Duralumin, is treated by anodizing to provide a hard surface layer of substantial thickness. This surface layer consists mainly of hard aluminum oxide ($Al_2O_3$). A finely divided sulphide of molybdenum, particularly molybdenum disulphide, is applied to the anodized surface by the use of a vehicle such as a silicone lubricant. After application of the molybdenum disulphide, all or a part of the vehicle can be removed by use of a solvent.

One specific procedure for practicing my method is as follows: A hard alloy comprising primarily aluminum, such as Duralumin, is treated after machining to provide clean surfaces suitable for anodizing. The part is then subjected to anodizing by use of a sulphuric-oxalic acid solution, and with the anodizing operation being continued to produce a relatively hard layer which for example can range from 0.001 to 0.002 inch in thickness. Preferably the solution is maintained at a low temperature such as 47° F. The surface may vary in color from grey to black, depending upon the constituents of the alloy.

Anodizing to produce a hard and relatively thick surfacing, as described above, has been known in the industry. In carrying out the process the part to be anodized is immersed in the acid solution, together with a lead cathode. A source of current at a voltage of the order of 40 volts is applied, with the positive side being connected to the part being anodized. While the process proceeds, the aluminum is oxidized to form a hard layer of alumina ($Al_2O_3$), which forms a dielectric film to ultimately interrupt flow of the current. After being anodized, the part is subjected to washing to remove acid, after which it is dried.

Finely divided molybdenum disulphide is now applied to the anodized surface, preferably in conjunction with a carrier medium such as a fluid or semifluid silicone lubricant. In practice the molybdenum disulphide can be homogeneously intermixed with the silicone lubricant, to form a viscous or paste-like mass, and then this material is spread over the dry anodized surface. Excess material is immediately removed from the surface as by wiping off, leaving a substantial amount of molybdenum disulphide enmeshed with the anodized surfacing, together with a thin surface film of silicone lubricant.

The anodized surfacing has some porosity at the time the molybdenum disulphide is applied. This porosity is sufficient to cause an enmeshing and interlocking action between the surfacing and the finely divided particles of the molybdenum disulphide. As a result the molybdenum disulphide becomes firmly integrated with the anodized surfacing, thus permanently modifying the surface frictional characteristics, and retaining such frictional characteristics, irrespective of the silicone lubricant. If desired a portion or all of the silicone lubricant may be removed as by application of a suitable solvent.

In Figure 1 I have illustrated a body 10 which is formed of Duralumin, and which has an anodized surface 11 applied to same. As indicated in Figure 1 this surfacing is enmeshed with homogeneously dispersed molybdenum disulphide.

In Figure 2 the anodized part 12 is in the form of a cylinder, having its inner peripheral surface 13 anodized and modified by molybdenum disulphide. The piston 14 is fitted within the cylinder, and is provided with the annular groove 16 for accommodating the resilient O ring 17. The O ring can be formed of suitable synthetic rubber or like resilient material. As is well known to those familiar with the use of resilient O rings, the groove 16 is dimensioned whereby the O ring is squeezed or compressed a slight amount in a radial direction. Therefore it presses against the surfacing 13, and this pressure may be increased by application of a differential fluid pressure. The peripheral surfaces of piston 14 may or may not be treated to form a surfacing similar to surfacing 13.

In an application such as schematically illustrated in Figure 2, the surfacing 13 is of such characteristics that it provides a minimum amount of friction to resist sliding movement of the O ring 17. The frictional characteristics remain substantially constant over a long period of time, particularly if the silicone vehicle is largely or entirely removed as by use of a suitable solvent. Because of the reduction in friction, wear on the O ring is likewise reduced to a minimum, thus making for long useful life in applications where considerable sliding action is encountered. Assuming that all or the major part of the silicone has been removed, after application of the molybdenum disulphide, the frictional characteristics remain substantially constant over a wide range of temperatures.

In the foregoing description it is assumed that machining of the parts is completed prior to anodizing. For particularly critical requirements the anodized surfacing can be smoothed by application of polishing powders or fine emery cloth, prior to application of the molybdenum disulphide. In this manner it is possible to produce surfaces to a high degree of accuracy.

It will be evident that customary procedures can be applied to confine the anodizing to the surfaces where it is desired, thus where only one surface area of the part is to be provided with the surfacing, other areas can be masked off, whereby the anodizing is applied to the surface where desired.

Where is it desired to provide a body having one area with ordinary protective anodizing, and another area with my special servicing, the first area can be masked off while the hard surfacing is being applied. Thereafter the remaining area can be treated for normal anodizing, as by use of a chromic acid solution. During the latter anodizing, the area having the hard surfacing is not affected.

The remarkable results secured by use of the present invention are attributed largely to the peculiar character of the hard anodized surface, which appears to have a unique affinity for finely divided molybdenum disulphide. This affinity is such that the disulphide firmly enmeshes itself upon the anodized surfacing, thus providing a dry lubricated surface which is highly durable and stable and which at the same time is hard and abrasion resisting.

I claim:

A method for surfacing aluminum base material, comprising forming a hard anodized surface layer upon the material, washing and drying the surface layer and then applying to the surface layer divided molybdenum disulphide dispersed in a silicone lubricant.

References Cited in the file of this patent

UNITED STATES PATENTS

| | | |
|---|---|---|
| 2,085,741 | Edwards | July 6, 1937 |
| 2,157,155 | Work et al. | May 9, 1939 |
| 2,387,872 | Bell | Oct. 30, 1945 |
| 2,420,886 | Laffoon | May 20, 1947 |
| 2,456,496 | Ford et al. | Dec. 14, 1948 |